United States Patent [19]

Marciniak et al.

[11] Patent Number: 4,811,595
[45] Date of Patent: Mar. 14, 1989

[54] SYSTEM FOR MONITORING FLUENT MATERIAL WITHIN A CONTAINER

[75] Inventors: Robert D. Marciniak; Lynn A. Poole, both of State College, Pa.

[73] Assignee: Applied Acoustic Research, Inc., State College, Pa.

[21] Appl. No.: 35,003

[22] Filed: Apr. 6, 1987

[51] Int. Cl.[4] .............................................. G01F 23/28
[52] U.S. Cl. ..................................... 73/149; 73/290 V
[58] Field of Search .................. 73/149, 290 B, 290 V

[56] References Cited

U.S. PATENT DOCUMENTS

| | | | |
|---|---|---|---|
| 2,666,326 | 1/1954 | Poole et al. ........................... | 73/149 |
| 2,706,906 | 4/1955 | Rich . | |
| 2,753,542 | 7/1956 | Rod et al. . | |
| 2,998,723 | 9/1961 | Smith, Jr. et al. . | |
| 3,075,382 | 1/1963 | Mathias ................................. | 73/149 |
| 3,100,390 | 8/1963 | Banks .................................... | 73/32 A |
| 3,110,890 | 11/1963 | Westcott et al. . | |
| 3,163,843 | 12/1964 | Dieckamp ........................ | 73/290 V |
| 3,220,258 | 11/1965 | Rod ................................... | 73/290 V |
| 3,286,098 | 11/1966 | Long et al. ........................... | 250/230 |
| 3,324,716 | 6/1967 | Roberts ................................. | 73/149 |
| 3,523,186 | 8/1970 | Cohn et al. . | |
| 3,540,275 | 11/1970 | Post et al. ....................... | 73/290 V |
| 3,596,510 | 8/1971 | Siegel et al. .......................... | 73/149 |
| 3,603,149 | 9/1971 | McKown .......................... | 73/290 V |
| 3,745,829 | 7/1973 | Franchi ............................ | 73/290 V |
| 3,985,030 | 10/1976 | Charlton .......................... | 73/290 V |
| 4,063,457 | 12/1977 | Zekulin et al. ................... | 73/290 V |
| 4,072,046 | 2/1978 | Lao ...................................... | 73/574 |
| 4,114,441 | 9/1978 | Magri ............................... | 73/290 V |
| 4,130,018 | 12/1978 | Adams et al. .................... | 73/290 V |
| 4,147,050 | 4/1979 | Rubel et al. ......................... | 73/1 H |
| 4,535,627 | 8/1985 | Prost et al. ...................... | 73/149 X |
| 4,535,628 | 8/1985 | Hope ................................ | 73/290 V |
| 4,561,298 | 12/1985 | Pond .................................... | 73/149 |
| 4,599,892 | 7/1986 | Doshi ............................... | 73/149 X |
| 4,640,130 | 2/1987 | Sheng et al. ..................... | 73/149 X |
| 4,689,553 | 8/1987 | Haddox ............................ | 73/149 X |
| 4,704,902 | 11/1987 | Doshi ................................... | 73/149 |
| 4,713,966 | 12/1987 | Thyen et al. ........................ | 73/149 |

FOREIGN PATENT DOCUMENTS

| | | | |
|---|---|---|---|
| 460445 | 3/1975 | U.S.S.R. ........................... | 73/290 V |
| 601577 | 4/1978 | U.S.S.R. ........................... | 73/290 V |

Primary Examiner—Tom Noland
Attorney, Agent, or Firm—Fleit, Jacobson, Cohn & Price

[57] ABSTRACT

The acoustical energy output of a source is varied in frequency between limits to sweep a frequency band encompassing cavity resonance conditions which depend on the quantity of a fluent material within a tank excited by such acoustical energy. The volume of the fluent material is calculated from the excitation frequency registered during verified detection of resonance conditions, based on abrupt changes in signal characteristics and stored data relating to the geometry of the acoustic sensor arrangement through which the tank interior is monitored.

18 Claims, 3 Drawing Sheets

SYSTEM FOR MONITORING FLUENT MATERIAL WITHIN A CONTAINER

BACKGROUND OF THE INVENTION

Field of the Invention

This invention relates to the monitoring of fluent materials such as liquids within a tank in order to determine the liquid volume, level or flow rate to or from the tank.

The prior art is replete with methods and systems for determining the quantity of liquid or liquid like materials in a tank on a continuous, intermittent or occasional basis. Most common amongst such prior art monitoring systems, are apparatus for determining liquid level in a tank utilizing, for example, a surface level float, an echo ranging device through which signals are reflected from the surface of the liquid being monitored and electromechanical sensors. In addition to acoustical types of devices utilized for monitoring liquid quantity within a tank, electrical devices have also been devised such as those based on the measurement of electrical capacitance.

One serious problem associated with prior liquid quantity monitoring systems arises from changes in the orientation of the liquid enclosing tank or its mounting on a moving vehicle subjecting it to acceleration forces. In an attempt to cope with such problems, acoustical devices utilizing the Helmholtz resonator principle have been proposed, as disclosed for example in U.S. Pat. Nos. 2,666,326, 3,075,382 and 3,324,716. Generally, the acoustical devices based on the Helmholtz resonator principle involve a tank configuration in which a main cavity is formed within which a liquid body is retained below an air space in communication with a restricted throat passage through which acoustical exciting energy is transmitted from an acoustical source and through which the resulting vibrations are sensed. The geometry of such a resonator configuration determines a cavity resonance frequency for the exciting acoustical energy at which resonance occurs as detected by a microphone mounted in the throat passage as explained for example in Roberts U.S. Pat. No. 3,324,716 aforementioned.

The use of the Helmholtz resonator principle in accordance with the prior art exemplified by the aforementioned prior U.S. patents, requires a comparison between the sensor outputs of a standard resonator container excited at its known resonance frequency and a container enclosing an unknown quantity of liquid in order to determine the liquid volume. According to the aforementioned Roberts patent, adjustment of the tank volume is effected until the standard Helmholtz resonator dimension is achieved. Such applications of the Helmholtz resonator principle render the prior art liquid volume monitoring systems relatively limited with respect to installation and application and often inaccurate.

It is therefore an important object of the present invention to provide a volume monitoring system for fluent materials utilizing the Helmholtz resonator principle in a unique and improved manner avoiding the drawbacks and limitations associated with the aforementioned prior art arrangements.

Another object of the present invention in accordance with the foregoing object is to provide an acoustic system for determining the quantity of fluent material within containers in an accurate manner without reliance on volume adjusting or standard resonator comparison techniques.

A further object in accordance with the foregoing objects is to provide a monitoring system not effected by motion of the tank enclosing the fluent material being monitored and not limited by any particular tank geometry or tank orientation.

SUMMARY OF THE INVENTION

In accordance with the present invention, the contents of a container or tank is monitored by imparting acoustical energy to its interior at a frequency that is varied or sweeps through a frequency band encompassing the frequencies at which cavity resonance occurs in dependence on the quantity of the fluent material in the tank. Accordingly, the frequency band includes a lower frequency limit corresponding to that of an empty tank and an upper limit corresponding to that of a full tank. The source of acoustical energy is generated externally of the container and may be in the form of a loudspeaker or transducer. In certain installations the source may be of installational or environmental origin such as vehicle vibration, aerodynamic noise, etc. Acoustically generated disturbances or vibrations imparted to the air mass in communication with the air space inside of the container is sensed through an acoustical receiver or transducer from which an input is transmitted to the monitoring system in response to excitation of the interior of the tank by the source of acoustical energy. In one embodiment of the invention, the monitoring system controls cyclic variation of the excitation frequency of the acoustical energy source between limits establishing the aforementioned frequency band.

The signal output of the acoustical receiver or sensor in accordance with the present invention is fed to a resonance detector of the monitoring system driven by a driver circuit under control of a data processor in order to recognize or detect the occurrence of resonance conditions within the tank being monitored as the excitation frequency of the acoustical source sweeps through the aforementioned frequency band. Upon detection of such resonance condition, the corresponding excitation frequency is registered within the data processor and based upon such registered resonance frequency, the corresponding volume of fluent material being monitored within the tank is calculated, utilizing data stored within the data processor. Such data from which the fluent material volume is calculated is based on the Helmholtz resonator principle pursuant to which the resonance frequency is a function of the sensor geometry and the fluent material volume. The calculating operation of the data processor may, if desired, be extended so as to differentiate the calculated volume with respect to time in order to obtain a readout of flow rate.

According to certain embodiments of the invention, the aforementioned data from which the volume of fluent material is calculated is permanently stored within a microprocessor chip for a given type of container installation, such as the fuel tank of an automotive vehicle. The tank is first filled with liquid fuel and then excited by the acoustical energy source at a frequency that is varied until resonance is detected and registered as resonance frequency for full tank volume. The liquid fuel is then reduced incrementally and the resonance adjustment of excitation frequency repeated for each increment until empty tank resonance is attained. The liquid fuel volume relationship to resonance frequency so determined is between upper and lower limits "burned into" the microprocessor chip in order to tailor operation of the monitoring system to automotive vehicle fuel tank installations for readout in terms of gallons of fuel. A similar procedure may be utilized to permanently store data corresponding to larger fuel tank installations, such as those in marine vessels, by incremental change in liquid volume between upper and lower limits under control of a liquid control valve.

An important aspect of the present invention involves the detection of resonance conditions in order to determine and register the corresponding excitation frequencies from which the fluent material volume is calculated. It has been determined in accordance with the present invention that recognition of resonance conditions may be effected by the detection of an abrupt change in the phase angle characteristic of the signal output of the acoustic receiver or sensor. Further, in order to verify recognition of resonance conditions by such method, at least one other signal characteristic is measured from the output of the acoustic receiver. One such signal characteristic is amplitude. The measurement of maximum or peak amplitude of the acoustic receiver output during the variation of excitation frequency occurs within a relatively short interval during which resonance conditions occur as detected from the abrupt change in phase angle. Alternatively, the interval within which acoustical impedance is at a minimum may be determined in order to verify resonance conditions. As a result of the foregoing methods of recognizing resonance conditions, errors resulting from spurious conditions may be avoided in order to provide a very accurate readout.

In accordance with another embodiment of the invention, the acoustical receiver or sensor is protected against excessive vibrations induced unintentionally, by mounting of the sensor and the speaker on an auxiliary cavity portion forming part of the tank configuration, such auxiliary cavity portion being connected by a throat passage to the main portion of the tank with an isolation membrane mounted within the throat passage.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENTS

Figure 1:
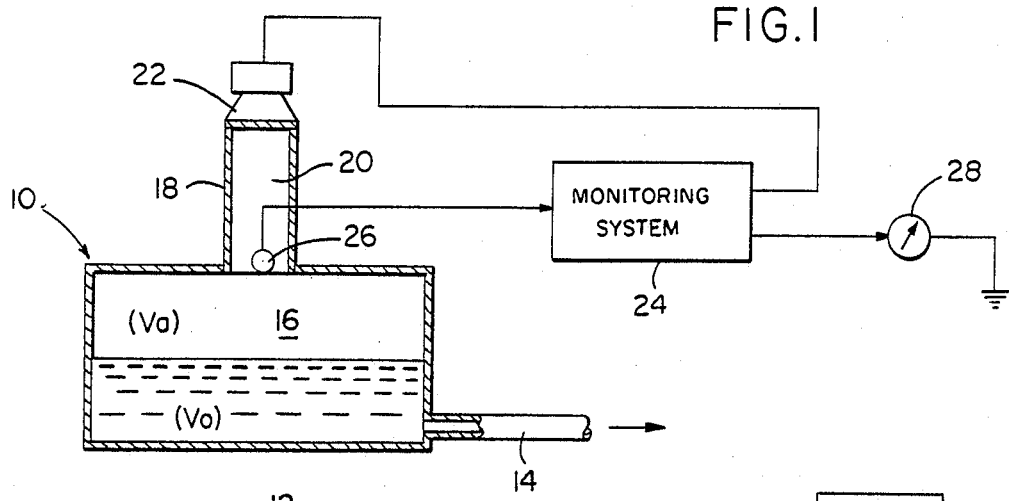
FIG. 1 is a schematic illustration showing a typical installation embodying one embodiment of the present invention.

Referring now to the drawings in detail, FIG. 1 illustrates schematically a typical container in the form of a sealed tank 10 enclosing a fixed volume within which a fluent material is confined in the form of a body of liquid 12. The volume ($V_o$) of the liquid body 12 may be varied by either inflow or outflow of liquid through conduit 14. A body of air or other gas 16 fills the tank space above the body of liquid. The tank includes an upwardly projecting neck portion 18 within which a throat passage 20 is formed. The foregoing tank configuration acts as a Helmholtz cavity resonator (as explained in Roberts U.S. Pat. No. 3,324,716 aforementioned) when its interior is acoustically excited by a source of acoustical energy at a resonance frequency which depends on the masses of the liquid body 12 and air 16. In the embodiment illustrated in FIG. 1, the acoustical energy source is in the form of an acoustical transducer, or speaker 22 mounted on the upper end of neck portion 18.

The excitation frequency of the acoustical energy output of speaker 22 may be under control of a monitoring system 24 as shown in FIG. 1 to which an input is applied from an acoustical vibration sensor in the form of an acoustic receiver, transducer or microphone 26 mounted on the neck portion 18 adjacent its lower end. In accordance with the present invention, the output of speaker 22 is varied in its excitation frequency within a frequency band encompassing resonance frequencies ($f_o$) that reflect the volume ($V_o$) of the liquid 12 being monitored by system 24 to provide a readout through any suitable display or meter 28. Although the source of exciting energy is shown in FIG. 1 as the system driven speaker 22 it should be realized that other external sources of exciting energy operating within the requisite frequency band could be utilized, including sources of environmental or installational origin, such as road noise, vehicle vibration, propulsion system noise, aerodynamic noise, or any combination of the foregoing.

Figure 3:
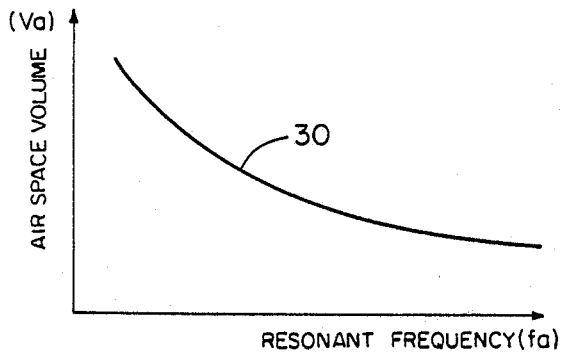
FIG. 3 is a graphical illustration of an acoustical signal characteristic relied on for operation of the monitoring system.

It has been established that the resonance frequency ($f_o$) of the exciting energy in the Helmholtz type resonator configuration of FIG. 1 is a function of the air space volume (Va) as shown by curve 30 in FIG. 3. Accordingly, the resonance frequency ($f_o$) is also a function of the liquid volume ($V_o$) since ($V_o$)+(Va)=(Vc), where (Vc) is the fixed volume of tank 10. Thus, the excitation frequency of the speaker output when cyclically swept through its frequency band will periodically produce resonance conditions, that are recognized by the monitoring system 24 through the sensor 26 to register the excitation frequencies of the speaker 22 corresponding thereto. From the data stored in the system 24, the liquid volume ($V_o$) is calculated from the registered frequency for readout through meter 28. By differentiating the liquid volume being calculated with respect to time, the system 24 may also provide a liquid flow rate readout.

Figure 2:
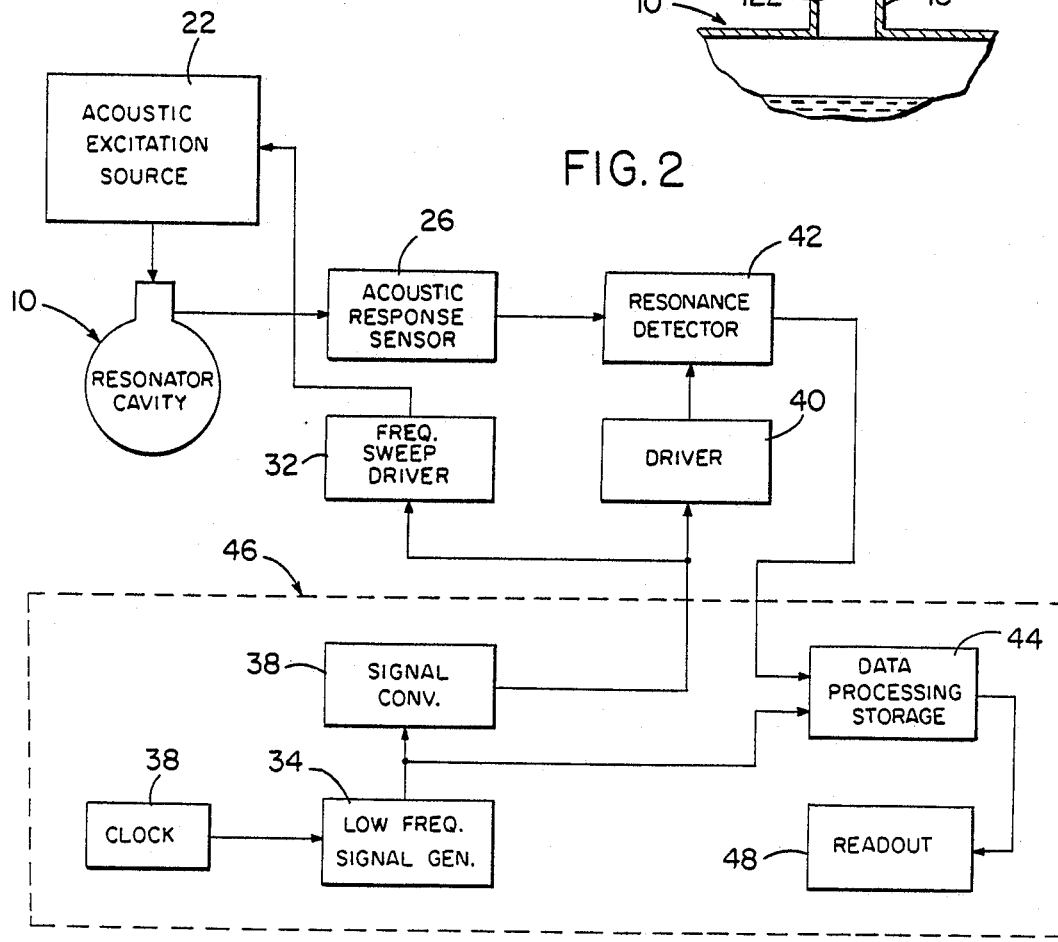
FIG. 2 is a functional block diagram illustrating the monitoring system in greater detail in accordance with one embodiment of the invention.

FIG. 2 schematically outlines the monitoring system 24 in accordance with one embodiment of the invention in which operation of speaker source 22 is controlled by a cyclic frequency sweeps driver 32, establishing the excitation frequency band between a lower resonance frequency limit corresponding to an empty tank 10 and an upper resonance frequency limit corresponding to a full tank. The driver 32 receives a time factor input from a low frequency signal generator 34 controlled by a system clock 36 through a signal converter 38. The signal converter 38 also applies an output to a driver circuit 40 through which a resonance detector 42 is operated to recognize the establishment of resonance conditions within tank 10 from the output of sensor 26. The output of detector 42 is applied to a data processing storage section 44 to which the output of signal generator 34 is also applied in order to register the excitation frequency at which resonance occurs to perform a liquid volume calculation and provide a readout to meter 28. The components 28, 36, 38 and 44 may form part of, or their functions may be performed by, a data processor 46.

In regard to the excitation source 22 and sensor 26, it should be understood that a wide variation of devices may be utilized depending on the frequency band of interest, cost, power requirements, environmental resistance, service life and other installational requirements. For example, with respect to excitation source 22 various loudspeaker devices of the electromagnetic, electrodynamic, piezo-electric, radiation, horn, air-modulated, mechanical or hydraulic activated, electric and electrostatic types may be utilized. As to the sensor or acoustic receiver 26, crystal, piezo-electric, ribbon, carbon, ceramic, condenser, electret, moving coil and hot wire types could be used to detect acoustical disturbances.

Figure 5:
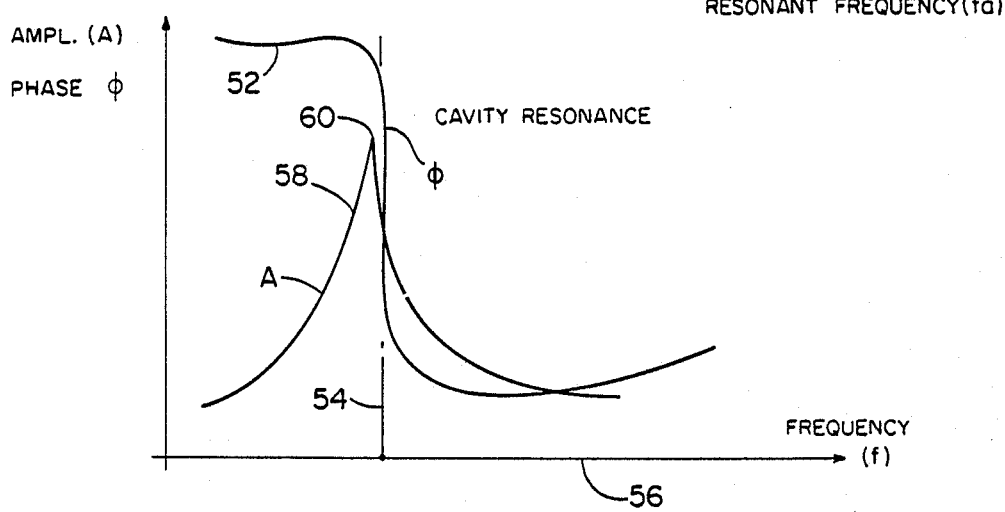
FIG. 5 is a graphical illustration of two of the signal characteristics associated with the acoustic receiver or sensor forming part of the system shown in FIG. 2.

It will be apparent that a critical aspect of the present invention resides in the recognition of resonance conditions from the sensing of acoustical disturbances by sensor 26 in response to excitation of the tank by the acoustical energy source 22. Such recognition of resonance is achieved by detector 42 from measurement of at least one of the characteristics of the acoustical disturbances sensed by the sensor 26, as graphically depicted for example in FIG. 5. Curve 52 in FIG. 5 is a typical plot of phase angle ($\phi$) as one measured signal characteristic of the acoustical disturbance sensed, versus excitation frequency (f). As shown in FIG. 5, an abrupt change in the phase angle ($\phi$) occurs when the excitation frequency is of a cavity resonance value ($f_o$) denoted by the intersection of resonance line 54 with the frequency abscissa 56. By detection of such abrupt change in phase angle of a signal derived from the sensor 26, detector 42 is effective to recognize establishment of resonance and identify the frequency ($f_o$) at which such resonance occurs.

As also shown in FIG. 5, the amplitude characteristic (A) of the acoustical disturbance sensed by sensor 26 is plotted as curve 58. Such amplitude curve 58 has a maximal peak or magnitude limit at 60 which occurs within a short interval during which resonance occurs to verify the recognition of resonance by the aforesaid detection of the abrupt change in the phase characteristic ($\phi$) in accordance with certain embodiments of the invention. As an alternative, the acoustical impedance characteristics could be determined from the sensor output and its minimum limits detected to verify resonance, since acoustical impedance is at a minimum under resonance conditions.

Figure 4A:
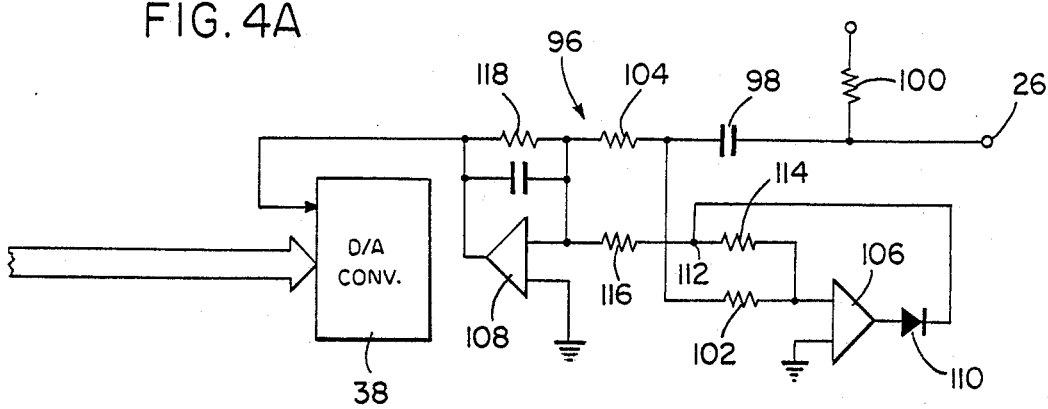
FIG. 4A is a circuit diagram showing in greater detail the resonance verification section, diagramatically shown in FIG. 4, in accordance with one embodiment of the invention.
Figure 4:
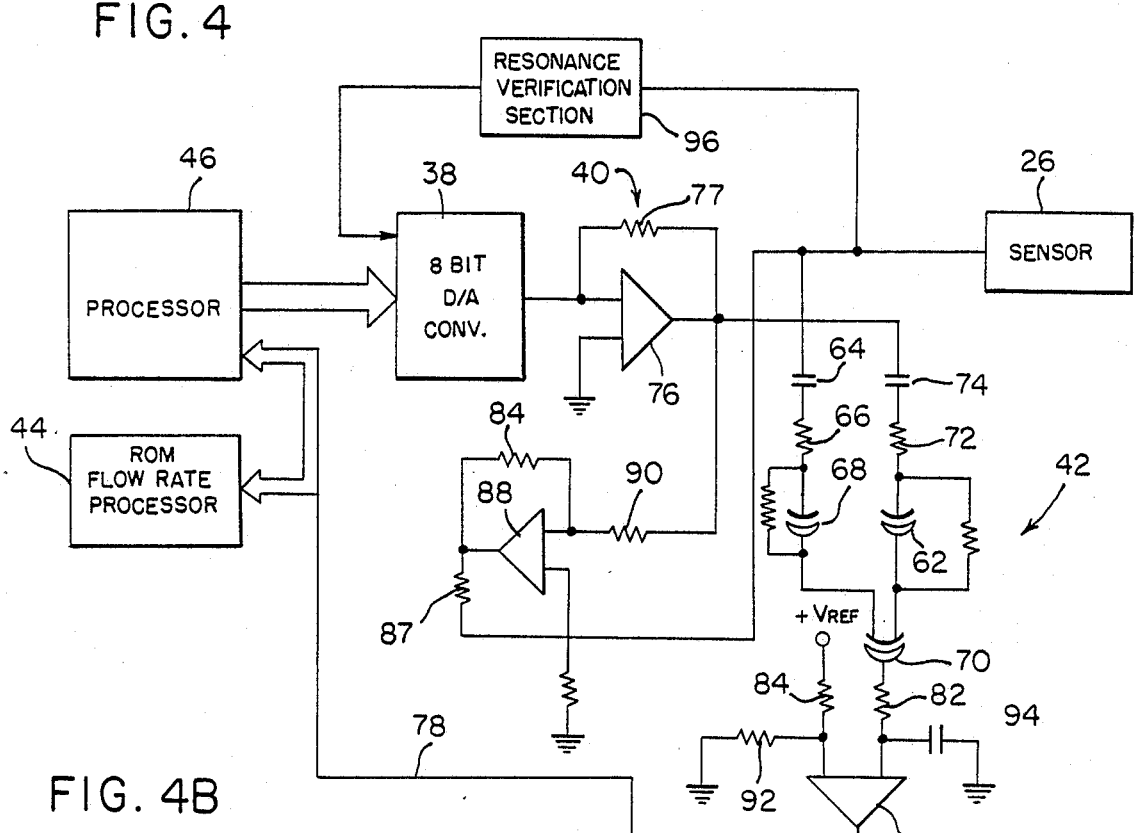
FIG. 4 is a circuit diagram illustrating in greater detail the driver and resonance detector components of the system shown in FIG. 2.

FIG. 4 illustrates the detector 42 of a single sensor system in greater detail according to one embodiment, wherein the output of sensor 26 is fed through a signal coupling capacitor 64 and resistor 66 to an exclusive OR gate 68. The output of OR gate 68 is fed to one input of OR gate 70, while its other input is coupled by OR gate 62 and series connected resistor 72 and capacitor 74 to the output of a voltage driven amplifier 76 of the driver circuit 40 having a feedback resistor 77. Amplifier 76 receives its analog input from an 8-bit digital to analog type of signal converter 38 associated with the data processor 46 to which a feedback signal is fed from the detector 42 through line 78 from the output of its comparator 80. One input to comparator 80 is coupled by resistor 82 to the output of the OR gate 70 while the other input is coupled by resistor 84 to a reference voltage source. The output of the voltage driven amplifier 76 is fed to OR gate 62 through capacitor 74 and resistor 72 of the detector 42 and by resistor 90 to the input of the amplifier of an acoustic driver 88 having a feedback resistor 86 and an output coupled by resistor 87 to the sensor output. Thus, the driver amplifier 76 is operative in response to its input from the data processor 46 through converter 38 to render comparator 80 operative simultaneously with the acoustical exciting speaker 22 under control of the data processor. The configuration described involving OR gates 68, 70 and 62 will supply an input to comparator 80 through resistor 82 that is a function of the phase angle ($\phi$) characterizing the acoustical input from the sensor 26, while the output of the comparator 80 in line 78 signals the phase change corresponding to resonance as depicted by curve 52 in FIG. 5. Such output in line 78 is fed to the data processing storage component 44 associated with data processor 46 in order to register the resonance frequency ($f_o$) at which resonance detection occurs and to calculate the corresponding liquid volume ($V_o$) and/or flow rate.

Verification of resonance is achieved as aforementioned by limiting the detection of an abrupt change in phase angle through detector 42 to the approximate occurrence of maximum amplitude or minimum impedance through a verification section 96 interconnected between the sensor 26 and the signal converter 38 as shown in FIG. 4. FIG. 4A shows one embodiment of the verification section 96 in detail based on measurement of signal amplitude. The output of sensor 26 is applied to a capacitor 98 of section 96 maintained above a lower potential through resistor 100 to apply inputs in parallel through resistors 102 and 104 to amplifiers 106 and 106. The positive going output of amplifier 108 is fed through diode 110 to the junction 112 from which an output voltage is applied through feedback resistor 114 to the input of amplifier 106 and through resistor 116 to the input of amplifier 108. The amplifier 108 has a feedback resistor 118 so as to provide an output proportional to a peak amplitude signal applied to its input as a result of the circuit configuration described.

Figure 4B:
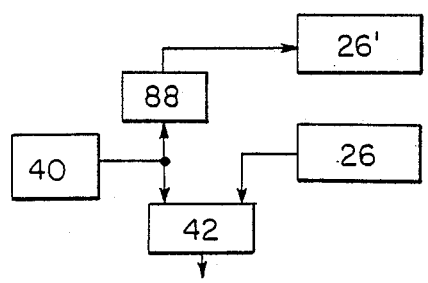
FIG. 4B is a block diagram showing a modification of the circuit arrangement of FIG. 4.

In a two-sensor system as shown in FIG. 4B, the driver 88 is coupled to a second sensor 26' rather than the sensor 26. The components shown in FIG. 4B otherwise form the same arrangement as shown in FIG. 4.

Figure 1A:
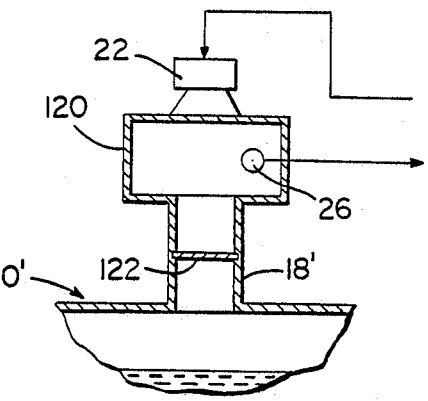
FIG. 1A is a partial schematic illustration showing a modification of the installation shown in FIG. 1.

Although FIG. 1 illustrates one particular mounting arrangement for the speaker 22 and sensor 26, other mounting locations for the speaker and sensor are possible. FIG. 1A shows the speaker 22 and sensor 26 mounted on an auxiliary cavity portion 120 of a modified tank configuration 10' in which the main portion of the tank enclosing the liquid body 12 is connected to the auxiliary cavity portion by a neck portion 18'. A membrane 122 within the neck portion separates the auxiliary cavity portion from the body of air in the main portion of the tank to isolate it from spurious operational modes of vibration induced and thereby protects the sensor 26 against excessive vibrations. In the case of the FIG. 1A configuration, two series related Helmholtz resonators are established. The two resonators when so combined react one n the other forming a coupled system with two degrees of freedom. Resonance conditions are detected as hereinbefore described with respect to FIGS. 1–5. A marked increase in resonator sensitivity can be realized with the dual resonator system of this type when properly tuned.

Figure 2A:
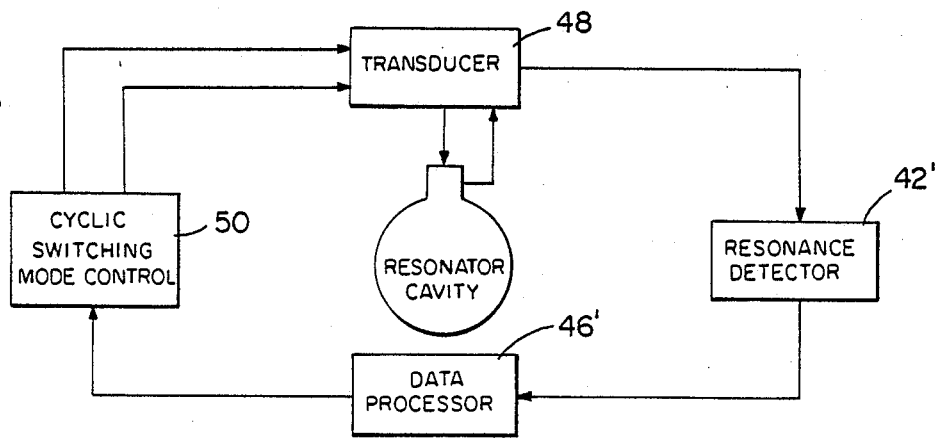
FIG. 2A is a simplified functional block diagram illustrating a modification of the monitoring system shown in FIG. 2.

In accordance with another embodiment of the invention shown in FIG. 2A, a data processor 46' functionally similar to data processor 46 may control operation of a dual mode type of transducer 48 through a cyclic switching mode control component 50 associated therewith. The transducer 48 replaces both the separate speaker 22 and sensor 26 by alternately operating in a transmit mode to excite the resonator cavity of tank 10 and in a receive mode to sense the acoustical vibrations emitted from the tank in response to excitation and thereby enable detector 42' to recognize resonance conditions at excitation frequencies reflecting the liquid volume in tank 10.

The fluent material hereinbefore referred to as liquid 12 may also include viscous materials and particulate solids as well as mixtures thereof having a measurable flow type characteristic forming an interface with the air or other gaseous material filling the rest of the tank space. Static tanks as well as tanks mounted in moving vehicles may be monitored.

Figure 6:
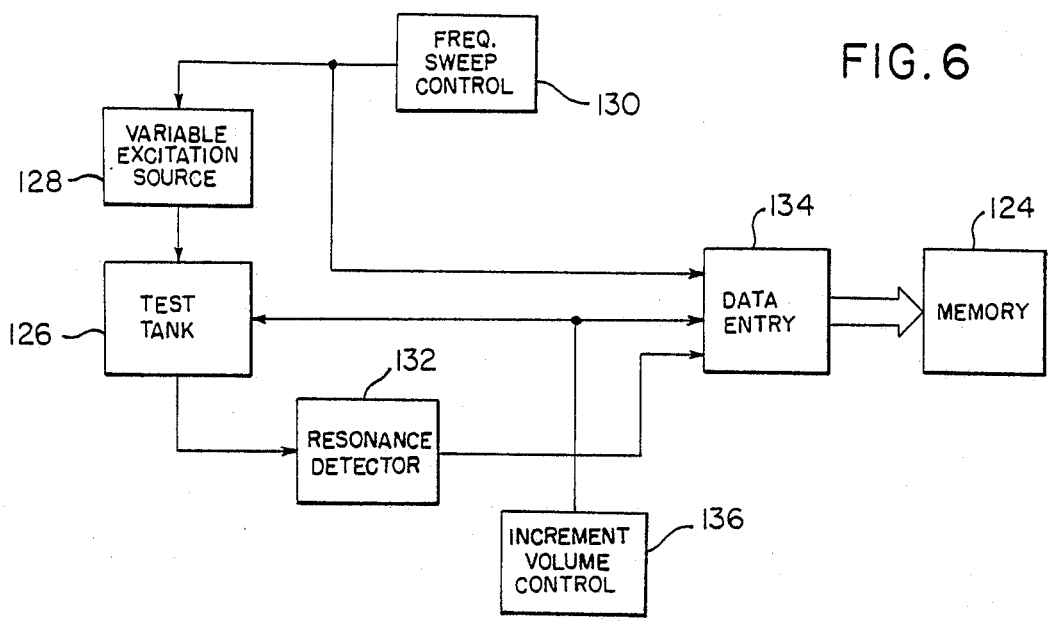
FIG. 6 is a block diagram illustrating a method of obtaining and storing volume calculating data for the monitoring system.

The volume calculating data in the storage section 44 as hereinbefore described with respect to FIGS. 2 and 4, may be obtained and permanently stored therein by means of microprocessor memory chip as depicted in FIG. 6. A test tank 126 characteristic of a particular type of container installation, such as the fuel tank of an automotive vehicle, is initially filled with the liquid to be monitored in order to establish an upper volume limit. The tank interior is then excited by acoustical energy from a source 128 corresponding to that of the monitoring system 24, with its frequency being varied by a frequency sweep control 130 until resonance is detected by detector 132. The output of detector 132 as well as frequency signals from frequency sweep control 130 are fed to a data entry component 134 through which the memory 124 receives and stores the data relating to upper liquid volume limit for test tank 126 and the excitation frequency at which resonance occurs. The quantity of liquid in tank 126 is then reduced in increments under control of signal output from control component 136. For each volumetric increment, the tank is again excited by source 128 under control of frequency sweep control 130 until resonance is detected by detector 132. Data is thereby collected and stored in memory 124 to incrementally establish in the memory chip liquid volume as a function of resonance frequency between the upper volume limit and a lower volume limit corresponding to an empty tank. The memory chip may then be plugged into the data processor to tailor the system to the desired installation. Data from installations other than automotive vehicles may be similarly obtained, including larger fuel tanks for marine vessels from which liquid fuel is incrementally withdrawn through an appropriate valve mechanism to program the microprocessor memory chip.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. In a method of monitoring an unknown volume of a fluent material within a container by directing acoustical energy at an excitation frequency into the container and sensing acoustical vibrations emitted therefrom having phase and amplitude characteristics, the improvement comprising the steps of: varying the excitation frequency to sweep a frequency band between limits respectively corresponding to cavity resonance conditions of the container when full and empty: measuring at least one of the characteristics of the acoustical vibrations during said variation in the excitation frequency; detecting abrupt changes in said one of the measured characteristics of the acoustical vibrations; registering the excitation frequency during said detection of the abrupt changes in the measured characteristic; and calculating the unknown volume of the fluent material from said registered excitation frequency corresponding to cavity resonance conditions of the container between said limits of the frequency band.

2. In the method of claim 1 wherein the container includes a resonator cavity within which the fluent material is confined and a throat passage through which the acoustical energy enters into the cavity.

3. The method of claim 1 wherein said one of the measured characteristics is phase angle.

4. The method of claim 1 wherein said one of the measured characteristics is amplitude and the abrupt changes detected are maxima peaks.

5. The method of claim 1 including the steps of: measuring another of the characteristics of the sensed vibrations during said variation in the excitation frequency; and detecting the maximum value of said other of the characteristics, said frequency registering step being limited to an interval during which detection of the maximum value of said other of the characteristics is detected.

6. The method of claim 1 including the steps of: differentiating the calculated volume of the fluent material with respect to time to determine flow rate of the fluent material with respect to the container.

7. A system for monitoring the quantity of a fluent material within a container, including a source of acoustical energy externally of the container, means for directing the acoustical energy from said source into the container, said acoustical energy varying in excitation frequency between frequency limits respectively established under cavity resonance conditions in the container when empty and full of the fluent material, means operatively mounted on the container for sensing acoustical vibrations emitted therefrom during said variation of the excitation frequency, means operatively connected to the sensing means for detecting abrupt changes in at least one of the signal characteristics of the sensed acoustical vibrations, data storage means connected to the detecting means for registering the excitation frequency of the acoustical energy during said detection of the abrupt changes corresponding to cavity resonance conditions in the container and data processing means connected to the storage means for calculating volume of said fluent material as a function of the registered excitation frequency and said frequency limits.

8. The combination of claim 7 wherein the signal characteristic of the sensed acoustical vibration is phase angle.

9. The combination of claim 8 including additional means for detecting an abrupt change in another of the signal characteristics of the sensed acoustical vibrations and means for rendering the detecting means operative to register the excitation frequency within an interval during which said detection by the additional detecting means occurs.

10. The combination of claim 7 wherein said container includes a resonator cavity within which the fluent material is confined and a throat passage portion through which the acoustical energy is directed into the cavity at the excitation frequency, and auxiliary cavity means connected in spaced relation to the resonator cavity by the throat passage portion for mounting the source of acoustical energy and the sensing means.

11. The improvement as defined in claim 7 wherein said source of acoustical energy is a speaker device and sweep control means connected to the data processing means for driving the speaker device at the varying excitation frequency.

12. The combination of claim 7 wherein said source of acoustical energy is of environmental origin.

13. The combination of claim 7 wherein said source of acoustical energy and the sensing means are formed by a common transducer device alternatively operated in transmit and receive operational modes and mode control means operatively connected to the data processing means for cyclically switching operation of the transducer device between said operational modes thereof.

14. In a system for monitoring the quantity of a fluent material, including a source of acoustical energy varying in excitation frequency, resonance cavity means into which said acoustical energy is directed for producing acoustical vibrations at a resonance value of the excitation frequency dependent on the quantity of the fluent material therein and sensing means for producing signals in response to said acoustical vibrations, the improvement residing in said resonance cavity means including separate interrelated chambers within which the fluent material is retained and the sensing means is located, respectively, means directing the acoustical energy into at least one of the chambers without interference for inducing the acoustical vibrations at said excitation frequency varying between limits respectively established by resonance conditions within said one of the chambers when empty and full of the fluent material retained therein, resonance detecting means connected to the sensing means for registering said resonant value of the excitation frequency during an abrupt change in characteristic of the signal produced in response to the acoustical vibrations being sensed and data processing means connected to the resonance detecting means for calculating the quantity of the fluent material as a function of the registered resonant value of the excitation frequency and the established limits thereof.

15. The system as defined in claim 14 including resonance verification means for detecting an abrupt change in another characteristic of the signal produced by the acoustical vibrations being sensed during said registration of the resonant value of the excitation frequency.

16. The system as defined in claim 15 wherein the other of the chambers forms an unobstructed passage between the acoustical energy source and said one of the chambers within which the fluent material is retained.

17. The system as defined in claim 14 wherein the other of the chambers forms an unobstructed passage between the acoustical energy source and said one of the chambers within which the fluent material is retained.

18. The system as defined in claim 14 wherein the other of the chambers is a resonance cavity within which the sensing means is located and passage means interconnecting said chambers.

* * * * *